June 19, 1951  M. S. SNELL  2,557,396
INDICATING THE POSITION OF UNDERCARRIAGES
OR OTHER AIRCRAFT PARTS
Filed Dec. 28, 1948  3 Sheets-Sheet 1

Inventor
MAURICE S. SNELL,
By Reynolds & Beach
Attorneys

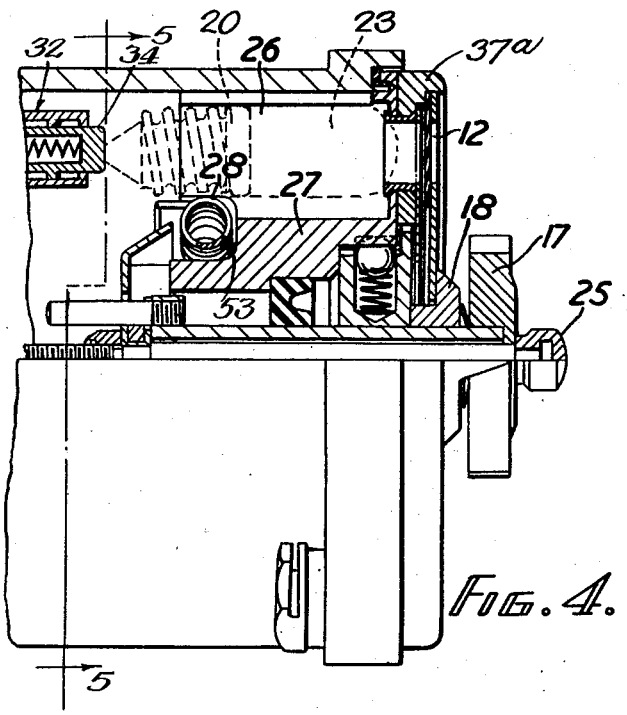
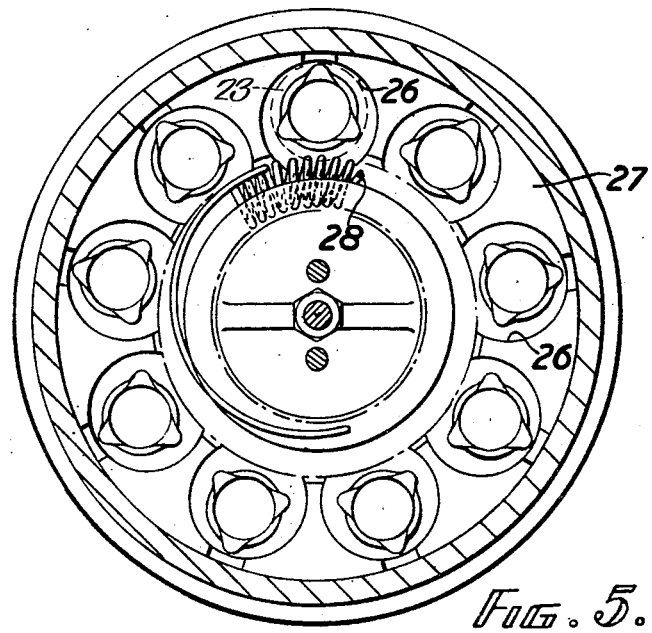

June 19, 1951          M. S. SNELL          2,557,396
INDICATING THE POSITION OF UNDERCARRIAGES
OR OTHER AIRCRAFT PARTS Filed Dec. 28, 1948          3 Sheets-Sheet 3

Inventor
MAURICE S. SNELL,
By Reynolds + Beach
Attorney

Patented June 19, 1951

2,557,396

UNITED STATES PATENT OFFICE 2,557,396

INDICATING THE POSITION OF UNDERCARRIAGES OR OTHER AIRCRAFT PARTS

Maurice Saxon Snell, Suttons Mill, Cranham, England, assignor to Dowty Equipment Limited, Cheltenham, England Application December 28, 1948, Serial No. 67,688
In Great Britain November 4, 1947

6 Claims. (Cl. 177—327)

This invention relates to instruments of the general nature disclosed in British Patent No. 514,165, of April 7, 1938, for indicating the position of movable parts of aircraft and more particularly, though not exclusively, to undercarriage indicators. These indicators are mounted on an instrument board or dashboard and comprise a number of electric lamps which are selectively illuminated to give to the pilot a ready visual indication of whether the parts of the undercarriage, more specifically, the port and starboard landing elements and the nose or tail wheel, are in a locked-down position, are unlocked, or are in an up-locked position. There are usually nine lamps arranged in a circular series of three groups of three, all disposed axially about a central axis. One group serves to indicate if the undercarriage is unlocked, and one of the other two groups serves to indicate if the undercarriage is locked down. The remaining group merely duplicates the second group and is switched into circuit should one or more of the lamps of the second group fail. In each group one of the lamps indicates the port side element of the undercarriage, another lamp indicates the starboard side element of the undercarriage, and the remaining lamp indicates the tail or nose element of the undercarriage. As regards the up-locked position, this is indicated negatively by the absence of illumination from any of the lamps. A standard type of undercarriage indicator therefore has nine lamps arranged as a circular series behind a corresponding number of viewing apertures. The three apertures corresponding to the unlocked position generally present a red light and the remainder a green light. One of the requirements of these instruments is that the viewing apertures should be more heavily screened during night flying to avoid the unpleasantness of continual glare. The screen used is in the form of a disc which can be turned about the center of the series of viewing apertures so that during daylight conditions a series of apertures in the screen coincides with the series of viewing apertures, and when the disc is turned for night flying conditions the viewing apertures are covered by the material of the screen. Another requirement is that each lamp should present at least a certain angle of vision. Together, these requirements have hitherto resulted in an instrument which is somewhat cumbersome and which occupies a substantial area of the dashboard, due in the main to the fact that the screw-in type of lamps used vary considerably in their over-all length which makes it necessary for the lamp socket to be spaced well back from the viewing aperture so as to be capable of receiving the longest lamp likely to be encountered.

The present invention has, among other objects, been devised with a view to providing an instrument which complies with the requirements mentioned, yet occupies a minimum area of the dashboard.

The present invention consists in locating the lamps radially by means permitting movement of the lamps in the axial sense, and in the provision of resilient members which by engagement with the contact ends of the lamps press the lamp bulbs against the surrounds of the respective viewing apertures. In this way, each lamp filament, irrespective of the lengths of the various lamps employed, will be situated as close as possible to its viewing aperture, enabling designers to provide for the requisite angle of vision whilst reducing the transverse dimensions of the instruments to a minimum.

The lamps may be located radially by resilient contact arms embracing the caps of the lamps, or the lamps may be located radially by being inserted into substantially cylindrical recesses in a one-piece member of heat conducting material. In the latter case a garter spring arranged substantially co-axially of the recesses may serve both to press the lamps radially outwardly within the recesses whereby to retain them, and to establish electrical connection with the lamp caps. The surrounds of the viewing apertures are preferably recessed complementarily to the shape of the lamp bulbs, tips in order still further to reduce the distance between the lamp filaments and the viewing apertures. Two embodiments of the invention will now be described by way of example with reference to the accompanying drawings, of which:

Figure 1:
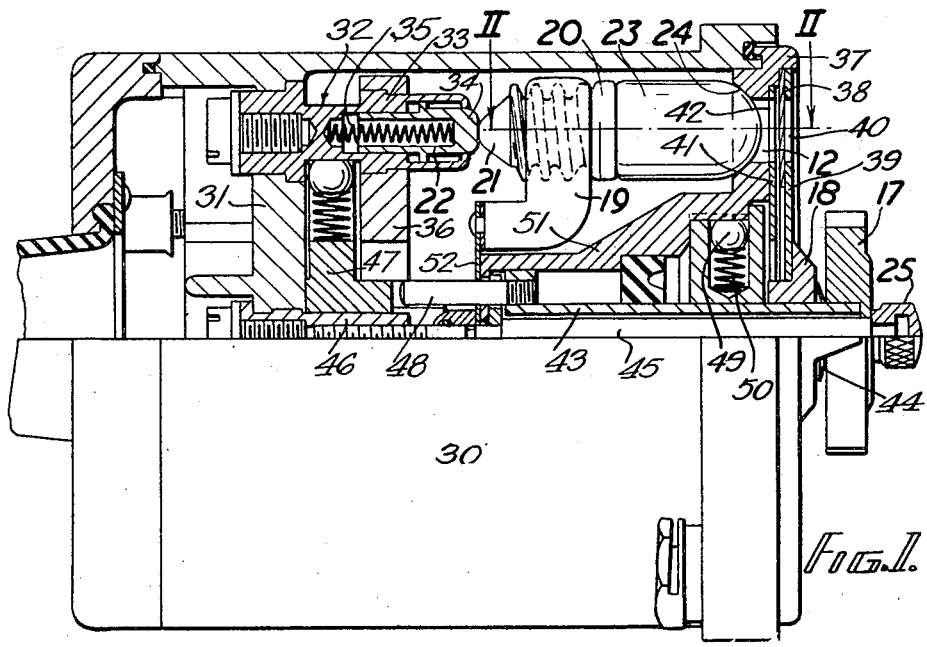
Figure 1 is a part sectional elevation of an instrument according to one embodiment.
Figure 2:
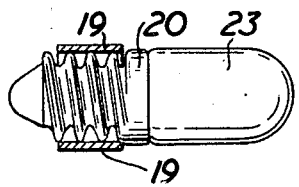
Figure 2 is a fragmentary sectional view on the line II—II in Figure 1.
Figure 2A:
Figure 3:
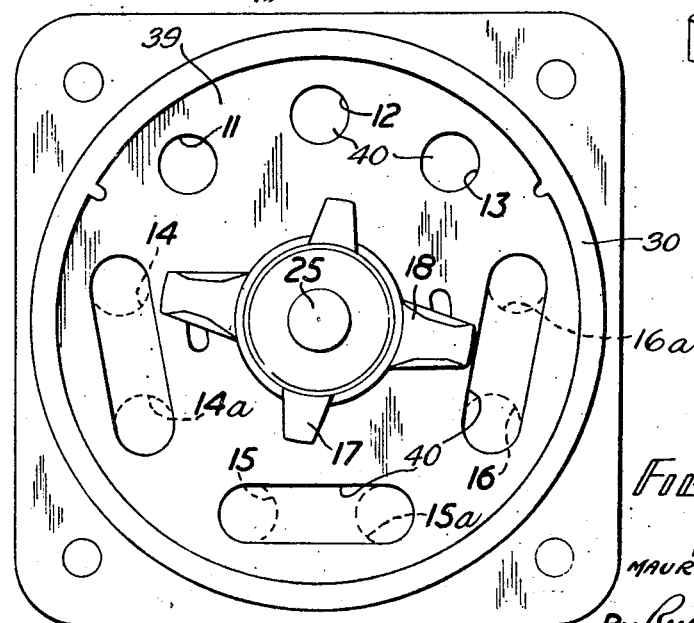

Fig. 2ª is a perspective view of one of the lamp holding spring clips;

Figure 3 is an elevation of the panel of the instrument as seen from the right hand end of Figure 1;

Figure 4 is a part sectional elevation illustrating a modification;

Figure 5 is a cross sectional view on the line 5—5 of Figure 4, and

Figure 6:
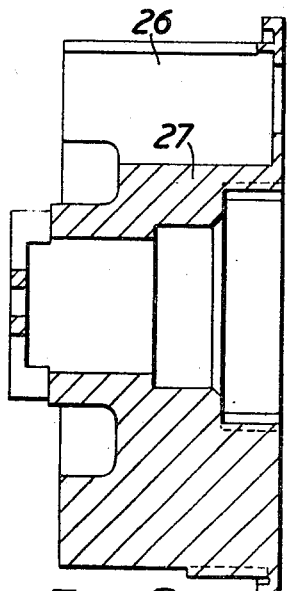
Figure 7:
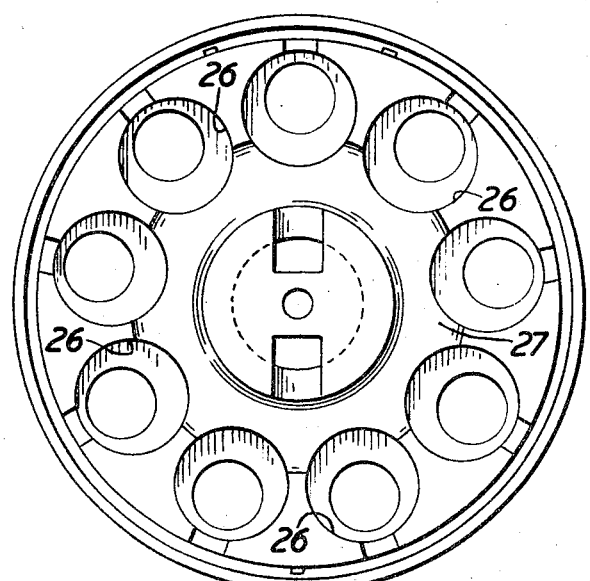

Figures 6 and 7 illustrate a detail of Figure 5 in sectional side elevation and in end view respectively.

Referring to the drawings in detail, first to the embodiment of the invention illustrated in Figs. 1 to 3, 30 designates a suitable casing which has rigid therewith and extending transversely relative thereto, in the rear end portion thereof, a wall 31 upon which are suitably mounted nine electrical contacts 32 of the plunger type. These contacts are arranged as an annular series about the axis of the casing 30, extend longitudinally relative to said casing, and preferably are equally spaced apart. Each contact includes a stationary barrel 33 and a plunger 34, the former of which is suitably mounted upon the wall 31 and the latter of which is guided by the former and is urged constantly forwardly relative thereto by a suitable spring 35. If desired, but not necessarily, the barrels 33 may be additionally supported by a ring 36 spaced forwardly from the wall 31.

Closing the front end of the casing 30 is a wall 37 in which is an annular series of viewing apertures which correspond in number and spacement to the contacts 32 and which are alined, respectively, longitudinally of the casing, with said contacts. These apertures comprise three groups of three apertures each, the apertures of one group being designated as 11, 12 and 13, and the apertures of the other two groups being designated as 14, 15 and 16 and 14a, 15a and 16a, respectively. A color screen 38 is carried by the wall 37 in covering relationship to the viewing apertures and has the portion thereof which covers the group of apertures 11, 12 and 13 of one color, red for example, and the portion thereof which covers the apertures of the other two groups of a different color, green for example. If desired, but not necessarily, an opaque plate 39 may be carried by the wall 37 in covering relationship to the color screen 38 to insure that no light from within the casing 30 shall be visible at the front of the instrument except through the viewing apertures in the wall 37 and through said color screen 38. If such a plate is employed it will, of course, be provided with apertures 40 alined with the viewing apertures.

Disposed behind the color screen 38 is a dimmer screen 41 of any suitable translucent material which is rotatable to aline or disaline an annular series of openings or transparencies 42 therein with and from the viewing openings. When the openings or transparencies 42 are alined with the viewing openings there is no interference by said dimmer screen with passage of light through the viewing openings. On the other hand, when the openings or transparencies 42 are disalined from the viewing apertures, the portions of said dimmer screen between the openings or transparencies therein cover the viewing apertures and serve to dim light passing through the same. During daylight the openings or transparencies 42 are alined with the viewing apertures, while during the night the portions of the screen 41 between the openings or transparencies 42 therein are alined with the viewing apertures to avoid glare.

The dimmer screen 41 is suitably connected to a knob 18 which is exposed at the front of the wall 37 whereby said dimmer screen may readily be rotated. The knob 18, by engagement with the plate 39, serves to hold said plate, the color screen 38 and the dimmer screen 41 in assembly with the wall 37.

Extending through a central opening in the knob 18 is a sleeve 43 upon the outer end of which is a knob 17 for effecting its rotation. The knob 17 is disposed in front of the knob 18 and between said knobs is interposed a spring washer 44.

Extending through the sleeve 43 is a rod 45 which is provided at its outer end with a knob 25 for effecting its rotation and which, at its inner end, is threaded into a member 46 mounted centrally in the wall 31. The knob 25 is disposed in front of and in engagement with the knob 17. Thus, when the inner end of the rod 45 is screwed into the member 46, the knob 25 acts through the knob 17, the spring washer 44 and the knob 18 to hold the plate 39, the color screen 38 and the dimmer screen 41 in assembly with the wall 37 and the latter in closing relationship to the front end of the casing 30. On the other hand, when the rod 45 is unscrewed from the member 46, the wall 37 and the parts carried thereby are released from the casing 30 for unitary removal therefrom.

The member 46 extends forwardly from the wall 31 and has rotatably mounted upon its forward end portion a switch member 47 with which the sleeve 43 is suitably connected, as by means of pins 48, whereby said switch member is rotatable by the knob 17. At 49 is indicated a detent in the form of a ball which is carried by the sleeve 43 and which is pressed by a spring 50 for engagement in suitable recesses in the front wall 37 to frictionally hold said sleeve and, hence, the switch member 47 in either of its two different circuit-establishing positions.

The front wall 37 has extending rearwardly therefrom a central tubular portion 51 to the rear end of which is suitably secured a conductor ring 52 which is connected to one side of a source of current the other side of which is controlled by the switch member 47.

Carried by the conductor ring 52 are nine lamp supports 19 in the form of U-shaped spring clips which are alined, longitudinally of the casing 30, with the plunger contacts 32 and the viewing apertures, respectively, and which are designed to receive the bases 20 of lamps 23 to hold said lamps alined with the viewing apertures and to permit said lamps to be shifted longitudinally regardless of whether their bases 20 are of the screw type illustrated or are of the well known smooth or cylindrical type. It will thus be apparent that, regardless of the lengths of the lamps 23, or of the type of their bases, they may be slid forwardly relative to their supports 19 to engage their front ends in recesses or seats 24 (sometimes termed "surrounds") formed in the rear side of the front wall 37 in surrounding relationship to the viewing apertures such as 12 in said front wall.

At the inner ends of the lamps 23 are the usual central, base contacts 21 which are alined with and engaged by the plungers 34 of the plunger contacts 32 whereby the lamps are urged forwardly by said plunger contacts to cause their front ends to engage the seats 24. It will thus be seen that the present structure provides for maintaining the front ends of the lamps seated in the recesses or seats 24 regardless of the lengths of the lamps and regardless of whether their bases are of the screw type or are of the smooth or cylindrical type.

By their association with the three different groups of viewing apertures the lamps 23 are, of course, divided into three different groups of three lamps each. One lamp of each of the three different groups represents, of course, one of the landing wheels of an airplane equipped with the present indicator; another lamp of each of said groups represents a second landing wheel of the airplane, and the remaining lamp of each group represents a third landing wheel of the airplane. For example, the lamps 11, 14 and 14a may represent the port landing wheel; the lamps 13, 16 and 16a may represent the starboard landing wheel, and the lamps 12, 15 and 15a may represent either the nose or the tail wheel, as the case may be. In this connection it is known practice to associate with the landing wheels suitable switches to open and close circuits to the related lamps of the three groups in accordance with the locked up and the locked down status of each of the landing wheels. The present invention does not involve anything new in connection with, and is not concerned with the details of, such switches and circuits. Moreover, they are well known. Therefore they have not been illustrated. Suffice it to say in this connection that when the landing wheels are locked up, none of the lamps will be illuminated and the locked up condition of said wheels therefore will be indicated negatively; that upon unlocking of the landing wheels the lamps of one of the groups, those alined with the viewing apertures 11, 12 and 13 for example, will be illuminated and will appear through the color screen 38 as red lights, to indicate the unlocked condition of said wheels; and that upon locking down of the landing wheels the lamps of one of the other two groups, those alined with the viewing apertures 14, 15 and 16, for example, will be illuminated and will appear through the color screen 38 as green lights, to indicate the locked down positions of said wheels and, at the same time, the lamps of the first mentioned group will be extinguished. The third group of lamps, those alined with the viewing apertures 14a, 15a and 16a, for example, normally are not used but are provided as reserve lamps to be switched into circuit with the lamps of the second group to serve in lieu of or as a check on the failure of any lamp, or lamps, of the second group which may fail to illuminate, until the necessary replacement or replacements can be made.

The switch 47 is merely for the purpose of normally excluding the third group of reserve lamps from service and of including the said group of reserve lamps in circuit with or in lieu of the lamps of the second group whenever desired. As in the case of the landing wheel switches, the present invention does not involve anything new in connection with, and is not concerned with the details of, the switch 47. Therefore said switch has been illustrated only to the extent of showing its general relationship to the other parts of the present indicator, particularly since such a switch is known as will be apparent by reference, for example, to British Patent No. 514,165 of April 7, 1938. Suffice it to say in connection with said switch 47 that by rocking the same in one direction, by means of the knob 17, the group of reserve lamps is excluded from circuit with the lamps of the second group, and by rocking the same in the other direction the group of reserve lamps is included in circuit with the lamps of the second group for the purpose heretofore stated.

Primarily the present invention is concerned with reduction in the over-all size of an instrument of the present type without lessening its angle of vision and particularly as concerns the mounting of the lamps 23 in the manner and for the purpose stated.

According to the alternative form of the invention illustrated in Figs. 4 to 7 of the drawings, the front wall 37a of the device has formed either integrally therewith or attached thereto a rearwardly extending member 27 in which are nine longitudinally extending recesses 26 which are alined with the viewing apertures in said front wall and which are designed to accommodate the lamps 23 which are urged forwardly by the plunger elements 34 of plunger contacts 32 in the same manner as described in connection with the Figs. 1 to 3 form of the invention to cause the front ends of said lamps, regardless of the lengths of the latter, to engage seats or surrounds at the rear ends of the viewing apertures. Suitably retained in a recess 53 in the rear end of the member 27 is an expansive garter spring 28 which urges all of the lamps radially outwardly to cause them, by engagement with the walls of the recesses 26, to become axially alined with the viewing apertures. The said garter spring 28 engages the bases 29 of the lamps, regardless of whether said bases are of the screw or cylindrical type, and additionally constitutes a conductor for connection in any suitable manner with one side of a source of current the other side of which is connected to the base contacts 21 of the lamps through the plunger contacts 32 and a switch member similar to the switch member 47, whereby the Figs. 4 to 7 form of the invention is operable in the same manner as the Figs. 1 to 3 form of the invention.

Obviously, according to the Figs. 1 to 3 form of the invention, the clips 19 serve to hold the lamps 23 in assembly with the front wall 37 for removal with the latter. Similarly, the garter spring 28 serves the same purpose in Figs. 4 to 7 form of the invention. The recessed member 27, if made of heat-conductive material, serves to dissipate the heat from the lamps which it supports.

I claim:

1. A signal device comprising a casing; a removable closure for the front of said casing including a wall having a plurality of sight openings therein and further having seats for the front ends of electric lamps disposed in said casing and alined, respectively, with said sight openings, yieldable circuit terminal means carried by said closure and engageable with the contact sheaths of said lamps and effective to hold said lamps alined with said openings and in assembly with said closure for removal with the latter, said circuit terminal means also being effective to hold said lamps for longitudinal movement so that they may be moved forwardly to engage said seats, and a plurality of spring-pressed circuit terminal elements mounted in said casing independently of said closure and engageable with the end contacts of said lamps to urge the lamps forwardly to maintain their front ends engaged with said seats despite differences in length of said lamps.

2. A signal device as set forth in claim 1 in which the yieldable circuit terminal means are in the form of spring clips to embrace the contact sheaths of the electric lamps.

3. A signal device comprising a casing, a removable closure for the front end of said casing including a wall having a plurality of sight openings therein and further having at the inner ends of said sight openings seats for the front ends of electric lamps, lamp receptacle means carried by said closure, a single yieldable circuit terminal element carried by said closure and engageable with the contact sheaths of lamps disposed in said receptacle means to hold the lamps in said receptacle means in alinement with said sight openings, respectively, and in assembly with said closure for removal with the latter, said terminal element being cooperable with said lamp receptacle means to hold the lamps for longitudinal movement so that they may be moved forwardly to engage said seats, and a plurality of spring-pressed circuit terminal elements mounted in said casing independently of said closure and respectively engageable with the end contacts of lamps in said receptacle means to urge the lamps forwardly to maintain their front ends engaged with said seats.

4. A signal device as set forth in claim 3 in which the single yieldable circuit terminal element is in the form of a garter spring.

5. A signal device comprising a casing, a closure for the front end of said casing having an annular row of sight openings therein and seats at the inner ends of said sight openings for the front ends of electric lamps, said closure also having, behind said seats, lamp-accommodating recesses, a garter spring engageable with the contact sheaths of electric lamps disposed in said recesses to urge them outwardly in said recesses into alinement with said sight openings, respectively, and to hold them for longitudinal movement so that they may be moved forwardly to engage said seats, and a plurality of circuit terminal elements mounted in said casing and respectively engageable with the end contacts of lamps in said recesses to urge the lamps forwardly to maintain their front ends engaged with said seats.

6. A signal device comprising a casing, a closure for the front end of said casing including a wall having a plurality of sight openings therein arranged about the axis of the casing and closure, and further having at the inner ends of said sight openings seats for the front ends of electric lamps, a lamp receptacle means within said casing in alinement with each sight opening, a single yieldable circuit terminal element positioned about such axis and engageable with the contact sheaths of lamps disposed in the respective lamp receptacle means to hold the lamps in said lamp receptacle means in alinement with said sight openings and for longitudinal movement forwardly to engage their seats, and spring-pressed circuit terminal elements mounted in said casing, in alinement with said lamp receptacle means, respectively, and each engageable with the end contact of the lamp in the related receptacle means to urge the same, independently of all other lamps, forwardly to engage and maintain its front end in engagement with its seat.

MAURICE SAXON SNELL.

REFERENCES CITED

The following references are of record in the file of this patent:

UNITED STATES PATENTS

| Number | Name | Date |
|---|---|---|
| 1,389,895 | O'Neil | Sept. 6, 1921 |
| 2,005,863 | Koch | June 25, 1935 |
| 2,064,964 | Wickes | Dec. 22, 1936 |
| 2,156,012 | Doyle | Apr. 23, 1939 |
| 2,234,954 | Berman | Mar. 18, 1941 |
| 2,340,053 | Grimes | Jan. 25, 1944 |
| 2,405,429 | Jewell | Aug. 6, 1946 |
| 2,424,574 | Marco | July 29, 1947 |

FOREIGN PATENTS

| Number | Country | Date |
|---|---|---|
| 829,337 | France | Mar. 28, 1938 |